Patented Mar. 17, 1953

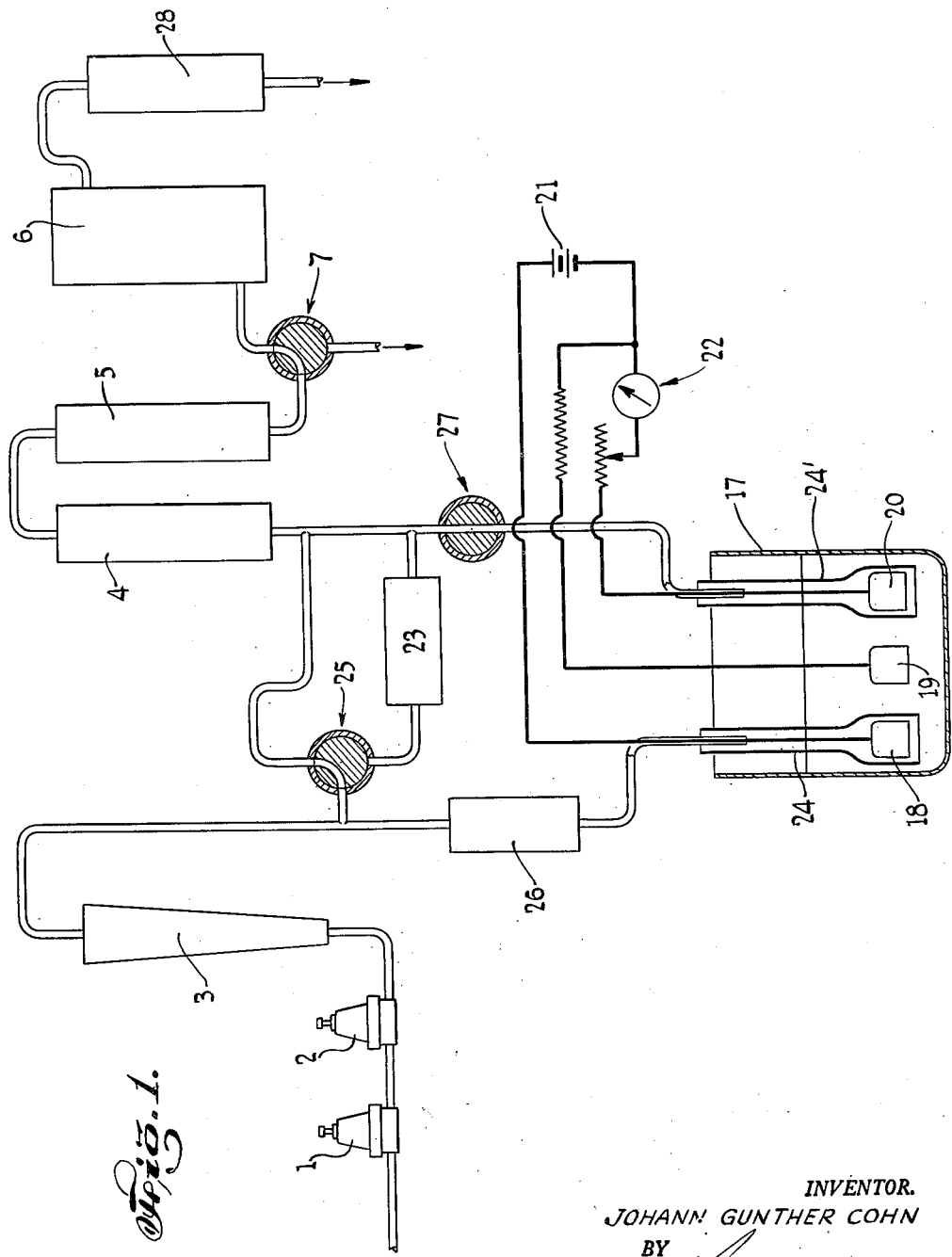

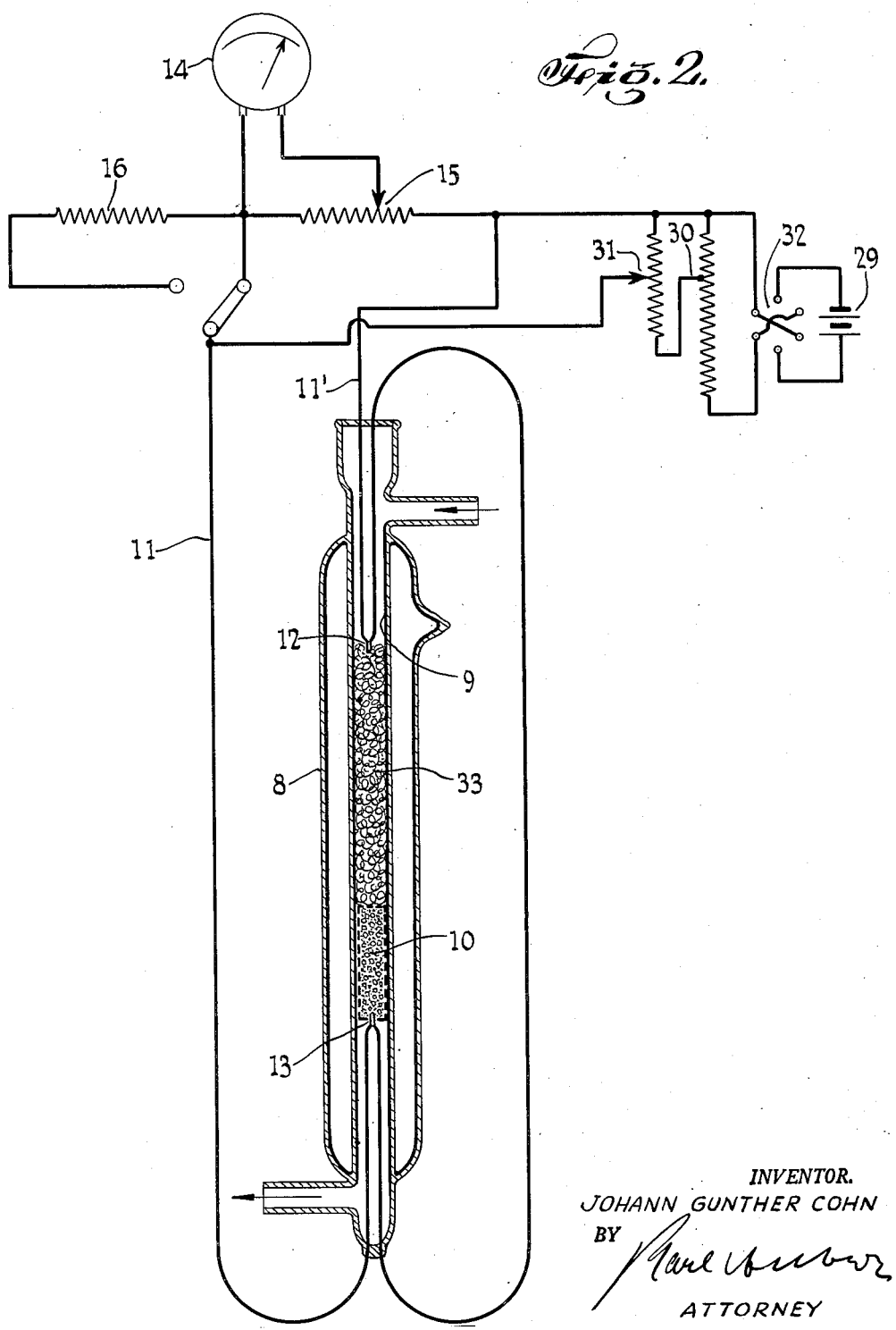

2,631,925

UNITED STATES PATENT OFFICE 2,631,925

APPARATUS FOR THE CONTINUOUS ANALYSIS OF OXYGEN AND HYDROGEN

Johann Gunther Cohn, East Orange, N. J., assignor to Baker & Company, Inc., Newark, N. J., a corporation of New Jersey Application February 14, 1947, Serial No. 728,676

7 Claims. (Cl. 23—255)

This invention deals with measurement devices and is concerned more particularly with the provision of an instrument for the continuous measurement of oxygen or hydrogen contained in gaseous media.

In many industrial and technical processes, it is a prime requirement that the gaseous medium, i. e. gas or gas mixture employed, be substantially free from oxygen or contain no more than a critical controlled amount thereof. Thus there is for instance an important industrial demand for hydrogen and other gases, e. g. inert gases such as argon, neon, nitrogen, carbon dioxide or saturated hydrocarbons such as methane, ethane and the like, either free from oxygen or containing oxygen below a critical amount. For example the nitrogen-hydrogen mixture of the ammonia synthesis, the nitrogen or rare gases used in the lamp and radio industry, the nitrogen or other gas for filling high power electrical cables, inert or reducing gases for the processing of metals, e. g. sintering, brazing, annealing and so forth should be free from oxygen or contain no more than traces of oxygen, in order to assure satisfactory results. In some uses the critical limit for the permissible oxygen concentration is in the neighborhood of a maximum of $\frac{1}{1000}$th of 1%, by volume, while in other cases, e. g. in the ammonia synthesis, oxygen concentration as high as a few hundredths of 1% might be permissible. In some processes on the other hand it is desirable to detect and measure small quantities of hydrogen impurities, rather than oxygen, in the gaseous medium.

It is therefore highly desirable to provide an instrument capable of detecting and measuring the presence of oxygen or hydrogen either for assaying or controlling the content of such oxygen or hydrogen. Many attempts have therefore been made to devise such an instrument, e. g. instruments in which oxygen concentrations are measured by means of thermal conductivity methods which however are not sensitive enough for the determination of the critical concentration range of 0.001% to 0.01%. Other instruments based on paramagnetism of oxygen or on the Joule-Thomson effect have likewise proved unsatisfactory. Direct thermal conductivity devices furthermore failed to indicate where the gases involved have similar coefficients of heat conductivity, as for instance, in the case of oxygen and nitrogen.

Still another principle which has been described in the literature in connection with analytical devices is that of utilizing the catalytic combination of oxygen and hydrogen. Such devices are however not reliable over extended periods of time in that the activity of the catalyst is subject to change in use which meant either frequent replacement of the catalyst or employment of a stable high temperature catalyst. In either case the design of any practical instrument is thus complicated and heaters employed to maintain the catalyst at a constant high temperature introduced an element of unsafety, so that altogether the performance of such devices was unsatisfactory and such devices were unpractical. Furthermore in devices of this type the lower limit of oxygen determinability was 0.01% oxygen which is rather insensitive.

The net result has been therefore that no practical instruments have been available for the continuous detection and measurement of minute quantities of oxygen, or hydrogen, contained in gaseous media.

It is therefore one object of this invention to provide an instrument for the continuous measurement and analysis of small quantities of oxygen in gaseous media which shall be operative even in the case of minute quantities of oxygen contained therein. It is another object of this invention to provide an instrument for the analysis and measurement of small, especially minute, quantities of hydrogen contained in gaseous media. It is a further object of the invention to provide such instrument which shall utilize the principle of catalytic combination of oxygen and hydrogen and which shall be reliable and accurate in its performance over extended periods of time. Other objects and advantages of this invention will appear from the description thereof hereinafter following:

The instrument of the invention thus utilizes the exothermic catalytic combination of oxygen and hydrogen, i. e. the reaction

$$O_2 + 2H_2 \rightarrow 2H_2O(\text{gas}) + 114.24$$

kilo calories. The amount of heat generated in the reaction is proportional to the oxygen combined with hydrogen in the reaction. The temperature increment depends on the specific heat of the gases of the gaseous medium, e. g. in the case of nitrogen with small quantity of oxygen such temperature increment is 0.164° C. to 16.40° C. for from 0.001% to 0.100% oxygen in the nitrogen. Where the primary gas involved is or contains hydrogen the reaction occurs spontaneously and the instrument is designed to measure the temperature increment and translate it into terms of oxygen content. Where the primary gas is nitrogen or other gas not containing hydrogen or where the gas does not contain an amount of hydrogen sufficient to permit a complete reduction of the entire oxygen content, suitable addition of hydrogen thereto is required in order to bring about and complete the catalytic reaction whereby the entire oxygen content is combined with hydrogen and the temperature increment of the complete reaction is utilized as an indication of the oxygen content. The measurement of hydrogen follows in substance the same principle and process except that in such case an excess of oxygen is substituted for an excess of hydrogen in order to bring about a complete combination of the entire hydrogen content with oxygen.

The instrument of the invention is illustrated in the drawings forming part hereof in which:

Fig. 1 represents schematic diagram of the instrument of the invention, and

Fig. 2 represents schematic diagram in enlarged form of a part of the instrument of the invention.

Referring more particularly to Figure 1 the gaseous medium after its introduction into the instrument is passed through pressure regulating valves 1 and 2, flow meter 3, purifier 4, and dryer 5 into a catalyst chamber 6 where the hydrogen and oxygen content of the gas is catalytically combined whereafter the gas continues its travel and exits from the instrument.

The pressure regulating valves 1 and 2 serve to assure a uniform rate of flow of the gaseous medium into and through the instrument. I prefer a dual assembly, as shown, to a single pressure regulating valve, since while the first valve eliminates the largest part of pressure fluctuations there is normally left a minimum pressure fluctuation which the second valve is designed to eliminate. Regularized flow at constant pressure thus prevails during the passage of the gas through the rotameter 3 to measure the volumetric rate of flow of the gaseous medium.

The purifier 4, containing for instance activated charcoal, serves to purify the gas from impurities, such as organic impurities, which might tend to poison the catalyst of the catalyst chamber 6. The dryer 5, containing for instance activated alumina, silica gel, or the like, serves to eliminate moisture carried along by the gaseous media. At a suitable point prior to the catalyst chamber 6 preferably as close thereto as possible is an escape valve 7. When the operation of the instrument is started this valve is advantageously in the open position to permit the gas to escape until the passing gas has thoroughly rinsed the system from air or other gas lest an explosive mixture might be formed in the instrument. During operation of the entire device this valve is of course in the closed position to permit passage of the gas therethrough to the remainder of the instrument.

The catalyst chamber is illustrated in detail in Figure 2. Preferably it comprises an insulated chamber, such for example as a vacuum jacketed vessel having a double wall, for instance of glass, such as outer wall 8, silvered on the inside as at 8′, and inside wall 9, silvered on the inside surface as at 9′ facing the silvered surface of the wall 8, with a vacuum between the thus silvered surfaces. Within the open tubular passage formed between inner wall 9 is the catalyst 10.

Any suitable catalyst operable at room temperature may be used. I prefer however the employment of a catalyst comprising palladium or platinum, either alone or with each other or with other catalyst metal, deposited on a carrier of refractory oxide, such as aluminum oxide or zirconium dioxide, advantageously in dehydrated form, e. g. in the form of activated alumina, which is characterized by a particularly high degree of catalytic efficiency. Other highly active catalysts, such as platinum or palladium, either alone or with each other or with other catalyst metal, deposited on activated carbon or charcoal may also be used. It may also be possible to use highly active base metal catalysts. One extremely useful catalyst is a catalyst of palladium on alumina containing 0.5% palladium by weight.

As previously stated, the heat of the reaction is utilized as the measuring criterion in the instrument of the present invention. The catalysts referred to are characterized not only by high conversion efficiency, which is of importance in regard to the accuracy of indication in the case of minute quantities of oxygen or hydrogen in the gaseous medium, but also by the development of a considerable temperature increment in the reaction.

The temperature increment is then measured and related to the oxygen content of the reaction. The increment can be measured in any suitable manner for instance with thermocouple, resistance thermometers, etc. An advantageous method of measuring such temperature increment is by means of a pyrometer which comprises a thermocouple, an indicator for measuring the E. M. F., and leads for connecting these elements to form a closed circuit. Referring to Figure 2 there is shown a thermopile comprising the customary wires 11 and 11¹, the cold junctions 12 being located in the gas stream ahead of the catalyst and the hot junctions 13 being located behind the catalyst, so that the thermopile indicates the difference between the temperature at the point of entry of the gas to and the temperature at the point of exit from the catalyst. For the sake of simplicity, only one junction on each side is shown in Figure 2.

A most important requirement of accurate measurement reading is that this temperature difference, equal to the heat of the reaction, is determined independently of any influence from the ambient temperature or changes in the ambient temperature. For this reason, it is critical that the catalyst as well as the cold and hot junctions of the thermopile be located well within the insulated catalyst chamber, as shown in Figure 2, and that while the cold junctions of the thermopile should be located at a point sufficiently removed from the catalyst in order not to be affected by the heat of the reaction, the hot junctions of the thermopile must be located as close as possible to the point of concentration of the highest temperature. For this reason, the cold junctions are placed at the entry to the elongated catalyst chamber, but well within such chamber, in the flowing gaseous medium, and at a distance from the catalyst itself, where the heat developed by the catalyst is prevented by the flowing medium from reaching such cold junctions, whereas the hot junctions are placed at the very end of the catalyst and still embedded therein, i. e. at a point where the concentration of heat is, under the impact of the flowing medium, at the highest. A glass wool or the like filter 33 is advantageously interposed between the catalyst 10 and the cold junctions 12 to assist in preventing back diffusion of heat.

It might be mentioned that the supported catalyst preferably comprises a plurality of individual pelleted supporting elements—e. g. aluminum oxide or zirconium dioxide or charcoal—on the surface of which the catalyst metal, e. g. platinum or palladium, is deposited, the individual pellets being held together by some holding means such for example as a perforated housing. The resultant catalyst cartridge is easily removed and can, when the need arises, be replaced.

The E. M. F. generated by the thermopile is measured in a suitable recording meter or indicator 14, which may be a galvanometer, forming part of or incorporated into the instrument, or a recording potentiometer connected to the instrument. The meter can be employed at the same time as a controlling means so that if the oxygen concentration rises above or falls below a predetermined safe value the meter automatically energizes controls designed to shut off the process or to correct whatever failure may be involved.

Many other means of measuring the temperature differential, or temperature increment resulting from the reaction, may of course be utilized.

In devices with a thermopile, electromotive power as small as a few microvolts are measured when the ozxygen or hydrogen concentration in the test gas is in the neighborhood of 0.001%. Not infrequently, such sensitive thermopile arrangements exhibit a certain small E. M. F. of their own of similar size which usually is practically constant in magnitude and size over long periods of time. In order to suppress this undesirable E. M. F. there is provided a stabilizing system comprising the elements 29 through 32, inclusive whereby a compensating D. C. potential is applied to the terminals of the thermopile which is delivered from D. C.-source 29 over the potential-divider 30 and adjusted to the appropriate value with the variable potentiometer 31. A reversal switch 32 serves to set the proper polarity of the compensating potential. In this way, the zero point of the device is stabilized.

Since the efficiency of highly active and sensitive catalysts as required for the instrument of the invention is apt to change with length of use, e. g. as the result of poisoning, fatigue, and so forth, the degree of completeness of the catalytic combination of the oxygen with hydrogen or the hydrogen with oxygen might become altered thus interfering with the reliability of such combination as an indication of the oxygen, or hydrogen, concentration.

The instrument of the present invention includes therefore means for calibration and easy re-calibration so that adjustments of the readings can be made conveniently to compensate for fluctuations in the catalyst activity. The calibration means, and re-calibration means, comprise an electrolytic cell 17 with electrodes 18, 19 and 20, adapted to generate oxygen and hydrogen on application of an electrical potential thereon from the source of power 21, the current being measured by meter 22, and the by-pass catalyst 23. Electrode 20 is an oxygen electrode and electrode 18 is a hydrogen electrode. The electrodes 18 and 20 are provided with a casing or hood 24 and 24¹, respectively, so that the hydrogen and oxygen, respectively, may be collected and added to the gaseous medium at a point prior to the valve 25 in the case of hydrogen and at a point subsequent to valve 25 in the case of oxygen. In the case of admission of hydrogen, it is advantageous to first pass the hydrogen through a dryer 26.

When it is desired to calibrate the instrument the gaseous medium is shifted via the valve 25 into the by-pass catalyst chamber 23, which contains any suitable catalyst for the combination of oxygen with hydrogen and which may of course be like the catalyst contained in the main catalyst chamber 6, for the purpose of removing all oxygen therefrom by the principle of catalytic combination. After the now oxygen-free gas has left the catalyst chamber 23, oxygen is added to the gas from the oxygen electrode 20 at a known volumetric rate of flow, the valve 27 being opened to admit the oxygen, and the gaseous medium which thus contains a known amount of oxygen is passed on through the remainder of the instrument, including the main catalyst 6 where the oxygen content is again reduced catalytically. From the known total volumetric flow rate and the measured known volumetric rate of flow the oxygen previously added, the readings of the meter 14 are calibrated. The amount of oxygen generated in the electrolytic cell and added to the gaseous medium is of course known from the input of electric current into the cell.

The electrolytic cell 17 performs a dual function in that it also serves as a source of hydrogen, via hydrogen electrode 18, when the gaseous medium does not comprise hydrogen or does not contain a sufficient amount of hydrogen to permit complete catalytic combination of the oxygen content. In such case, the electrical potential is applied on the hydrogen electrode 18 and an open oxygen electrode 19, rather than on the hydrogen electrode 18 and the enclosed oxygen electrode 20. In the operation of the open oxygen electrode 19 the oxygen generated is permitted to escape.

While the instrument therefore requires, and provides for, calibration and re-calibration, it is nevertheless necessary to maintain a given scale of gas concentration reading. Direct relation of the scale to the total temperature increment measured becomes therefore difficult in the case of re-calibration. Instead of directly measuring the total temperature increment, I provide means for measuring only a fraction of the total temperature increment. Since the fraction measured can be varied continuously and at will to any desired degree, it is thus possible to compensate on re-calibration for the changes of catalytic activity by appropriately changing the fraction measured, e. g. by increasing the fraction measured after re-calibrating the instrument on a decrease of the catalytic activity.

Where the temperature increment is measured by means of a thermopile, the E. M. F. of the thermopile, 11 and 11¹, may be subdivided by a variable potentiometer 15. Another subdivision of the thus fractionated E. M. F. can be carried out by a fixed resistor 16, say for instance, 1 to 2. This subdivision increases the voltage range measured by the fractionated ratio, e. g. 2, and consequently also increases the concentration range covered by the instrument. Where the temperature increase is measured with a resistance thermometer the unbalance of the bridge circuit caused by the temperature increase can be measured with a galvanometer connection with a variable shunt of suitable resistance and fractions of the temperature increase are measured by varying the shunt.

At the end of the instrument, after the gaseous medium has passed through the catalyst 6, it is advantageous to provide a final dryer 28. The purpose of this dryer is two-fold. It absorbs the moisture formed as the result of the catalytic combination of the oxygen and hydrogen and also avoids back entry of air or moisture into the instrument.

The present invention thus provides a simple and highly efficient device for the determination and measurement of even minute quantities of oxygen or hydrogen in gaseous media, incorporating means for the admission, when required, of oxygen or hydrogen into the gaseous medium and incorporating means for easy calibration and re-calibration. The instrument is independent of co-efficients of heat conductivity and is applicable whether or not oxygen and the principal gaseous medium have the same or a different co-efficient of thermal conductivity.

While I have described the instrument with particular reference to the detection and measurement of the oxygen content of gaseous media involving the catalytic reduction of such oxygen content the instrument is equally applicable to the detection and measurement of the hydrogen content of gaseous media involving the catalytic oxidation of such hydrogen content.

When the instrument is thus used for the continuous detection and measurement of hydrogen, rather than oxygen, in a gaseous medium, the electrodes 18, 19 and 20 of the electrolytic cell 17 are used with reverse polarity during the calibration or re-calibration and the addition of oxygen or hydrogen, respectively.

The instrument is designed to accurately measure the oxygen content up to 1% and the hydrogen content up to 2%, the limits being critical as to accuracy of the measurement. It is sensitive down to 0.001%, and less, of oxygen, and to 0.002%, and less, of hydrogen. The instrument is thus capable of detecting and measuring such content of oxygen and hydrogen, respectively, from such small quantities down to minute traces of such oxygen and hydrogen.

The flow of the gaseous medium through the catalyst chamber must be at a rate adapted to achieve the proper measurement of the temperature increment without being affected by heat diffusion away from the measuring means and to permit proper utilization of the catalyst in the reaction. Thus the linear flow through the catalyst must approximate at least 50,000 cm. per hour, at least where the temperature differential is measured by a thermopile arrangement as shown in Figure 2. If, for example, the cold junctions of the thermopile were located elsewhere in the instrument at a point of standardized temperature, the minimum linear flow rate might be at a lower value, which would also be true if the temperature increase were measured with a resistance thermometer against a standardized instrument temperature. The maximum flow rate is a function of the capacity of the catalyst to combine the oxygen and hydrogen in the gaseous medium with the required efficiency. The maximum flow permissible is, generally, 100 liters per hour per 1.5 to 3 grams of catalyst.

Where the instrument of the invention is utilized for detecting and measuring oxygen and hydrogen in a flowing stream of gas a sample thereof is diverted through the instrument. Where the instrument is used as a control means, the diverted sample may likewise be in the form of a continuous flow of gaseous medium.

The instrument may be used as a Null-indicator or as a continuous recorder. In the former case, the instrument is set to show no reading as long as the oxygen concentration remains below the set amount, e. g. below 0.001%, and shows a reading only when the concentration goes above such set limit. In the latter case, the instrument records the oxygen concentration continuously but may also be set to act simultaneously as a controller when the oxygen concentration rises above or drops below a set value.

The instrument is thus designed to accurately detect and assay even minute quantities of oxygen or hydrogen, the elementary gaseous constituents of water, in a gaseous medium, by means of the catalytic combination thereof to form water, and utilizing the temperature increment to calculate the amount of elementary gaseous constituent combined, including specific calibration and re-calibration means.

What I claim is:

1. A measuring apparatus for the continuous detection and assay of gaseous media containing amounts of a member of the group consisting of oxygen and hydrogen in a low concentration range, said apparatus comprising conduit means including gas inlet means leading therefrom, a first pressure regulating valve means in said conduit means adapted to regulate the flow of the gaseous medium, a flow meter for the determination of the volumetric rate of flow of the gaseous medium in series with said valve means and connected to the output thereof, a purifier chamber adapted to include a purging medium for removing impurities from said gaseous medium, a first dryer chamber adapted to contain a moisture gathering medium, an insulated catalyst reaction chamber adapted to contain a catalyst operable at room temperature to initiate and maintain the reaction $O_2 + 2H_2 \rightarrow 2H_2O$ (gas) $+114.24$ kilo calories, said conduit means interconnecting said purifier and dryer chambers to said reaction chamber from the output of said flow meter, thermal responsive temperature measuring means to measure the temperature increment due to the heat developed by said reaction operatively associated with said reaction chamber and including at least two temperature sensing elements positioned adjacent said catalyst and adapted to enable the determination of the heat of the reaction independently of any influence from the ambient temperature, said thermal responsive temperature measuring means exhibiting the characteristic of generating a small E. M. F., back E. M. F. compensating means including a source of electrical energy connected to said temperature measuring means to supply a compensating potential of proper polarity thereto and establish a zero point of the apparatus, and calibration and re-calibration means communicating with said catalyst chamber and adapted to adjust the readings of the apparatus to compensate for fluctuations in the catalyst activity interposed in said conduit means between said flowmeter and said purifier chamber.

2. The measuring apparatus of claim 1 wherein said back E. M. F. compensating means supplies a compensating D. C. potential to the hot and cold junctions of said thermopile and includes a source of D. C. potential, a potential divider electrically connected to receive compensating potential of proper polarity from said source of D. C.

potential, and a variable potentiometer interconnected with said divider and said temperature sensing elements which may be adjusted to transmit a potential equal to the small E. M. F. generated by said temperature measuring means but of opposite polarity.

3. The measuring apparatus of claim 1 including a variable E. M. F. subdividing means directly connected to and between said two sensing elements and an indicator, and wherein the calibration and re-calibration means includes an electrolytic cell containing an electrolyte, a source of electrical power, a by-pass catalyst chamber adapted to contain a catalyst for the combination of oxygen with hydrogen, and a plurality of electrodes immersed in said electrolyte and adapted to generate oxygen and hydrogen on application of an electrical potential thereon from the source of power for adding a quantity of said member to said gaseous medium at a known volumetric flow rate to enable a calibration of said indicator in accordance with the temperature increment due to the heat developed by said catalytic reaction of the known quantity of said member by means of the E. M. F. subdividing means.

4. The measuring apparatus of claim 1 wherein the calibration and recalibration means includes an electrolytic cell, three electrodes immersed in said cell, one of which is adapted to generate hydrogen and the remaining electrodes are adapted to generate oxygen, at least one of the remaining oxygen electrodes and the hydrogen electrodes being provided with a collecting hood means, a source of electrical power, a by-pass catalyst chamber adapted to contain a catalyst for the combination of oxygen with hydrogen interposed in said conduit means, a by-pass valve means in said conduit means adapted in one position to interconnect said flow meter to said purifier chamber and in another position to interconnect said flow meter to said by-pass chamber, a second dryer chamber in said conduit means adapted to contain a moisture gathering medium and positioned between said hydrogen collecting hood means and said flow meter whereby the hydrogen collected from said hydrogen electrode is passed through said second dryer and is then added to the gaseous medium at a point prior to the by-pass valve means, said collecting hood means of said oxygen electrode providing for the collection of oxygen and including a third valve means allowing for the addition thereof to the gaseous medium at a point subsequent both to said by-pass valve means and to said by-pass chamber.

5. The measuring apparatus of claim 1 wherein said insulated catalyst reaction chamber comprises a vessel having an inner and an outer glass tubular like wall, said outer glass wall being sealed at its ends to said inner wall to form an outer insulating jacket chamber therebetween, said jacket chamber walls being coated with a metallic deposit of high reflectance, said inner tubular like passage formed between said inner wall having an inlet and outlet passageway interconnected to said conduit means and being adapted to contain said supported catalyst, the sensing elements consisting of a hot and a cold junction of a thermopile, the hot junction being located within said inner passageway at a point close to the exit therefrom and in intimate proximity behind the catalyst, the cold junction being located in said inner passageway at a point close to the gas inlet passageway ahead of the catalyst, and a filtering medium interposed between the catalyst and the cold junction to prevent back diffusion of heat from the reaction catalyst.

6. The measuring apparatus of claim 5 wherein the thermal responsive temperature measuring means comprises a thermopile including said hot and cold junctions, an indicating recorder meter calibrated to express said temperature increment in terms of the content of said member catalytically combined in the said reaction and a potentiometer circuit therebetween including means to fractionate the potential developed in said thermopile.

7. The measuring apparatus of claim 6 wherein said indicator has first and second terminal leads, said first terminal lead being interconnected with one of the said junctions by a switch means, a variable potential divider having its resistor element interconnecting said first terminal lead with the other of said junctions, a sliding contact electrically associated with said resistor element, said second terminal lead being electrically connected to said sliding contact, whereby the amount of electrical output fed by said sensing means to said meter may be changed when the activity of said catalyst becomes reduced by positioning said switch means to interconnect said first terminal lead to said first mentioned junction, and a fixed fractionating resistor interconnected to said first terminal lead and to said switch means whereby when said switch means is positioned to interconnect said fractionating resistor with said first mentioned junction the E. M. F. fed by said sensing means may be fractionated in a fixed ratio to increase the concentration range covered by the instrument.

JOHANN GUNTHER COHN.

REFERENCES CITED

The following references are of record in the file of this patent:

UNITED STATES PATENTS

| Number | Name | Date |
| --- | --- | --- |
| 548,909 | Duke | Oct. 29, 1895 |
| 1,375,933 | Rideal et al. | Apr. 26, 1921 |
| 1,578,666 | Katz | Mar. 30, 1926 |
| 1,922,666 | Daynes | Aug. 15, 1933 |
| 2,005,036 | Howe | June 18, 1935 |
| 2,010,995 | Jacobson | Aug. 13, 1935 |
| 2,013,727 | Douglass et al. | Sept. 10, 1935 |
| 2,079,601 | Canfield | May 11, 1937 |
| 2,084,954 | Griswold | June 22, 1937 |
| 2,197,370 | Sullivan | Apr. 16, 1940 |
| 2,260,821 | Bendy | Oct. 28, 1941 |
| 2,393,220 | Jacobson et al. | Jan. 15, 1946 |
| 2,393,362 | Gerhold | Jan. 22, 1946 |
| 2,404,993 | Sullivan | July 30, 1946 |
| 2,408,396 | Horsley | Oct. 1, 1946 |
| 2,417,321 | Park et al. | Mar. 11, 1947 |
| 2,422,129 | Perly et al. | June 10, 1947 |
| 2,423,377 | Ferguson, Jr. | July 1, 1947 |

FOREIGN PATENTS

| Number | Country | Date |
| --- | --- | --- |
| 477,026 | Great Britain | Dec. 16, 1937 |
| 491,154 | Great Britain | Aug. 26, 1938 |

OTHER REFERENCES

Larson and White, J. of Am. Chem. Society, vol. 44, pages 20–25 (1922).

Webster's International Dictionary, 2nd ed., page 1933, G. & C. Merriam Co., Publ., Springfield, Mass. (1941).